Patented Apr. 21, 1936

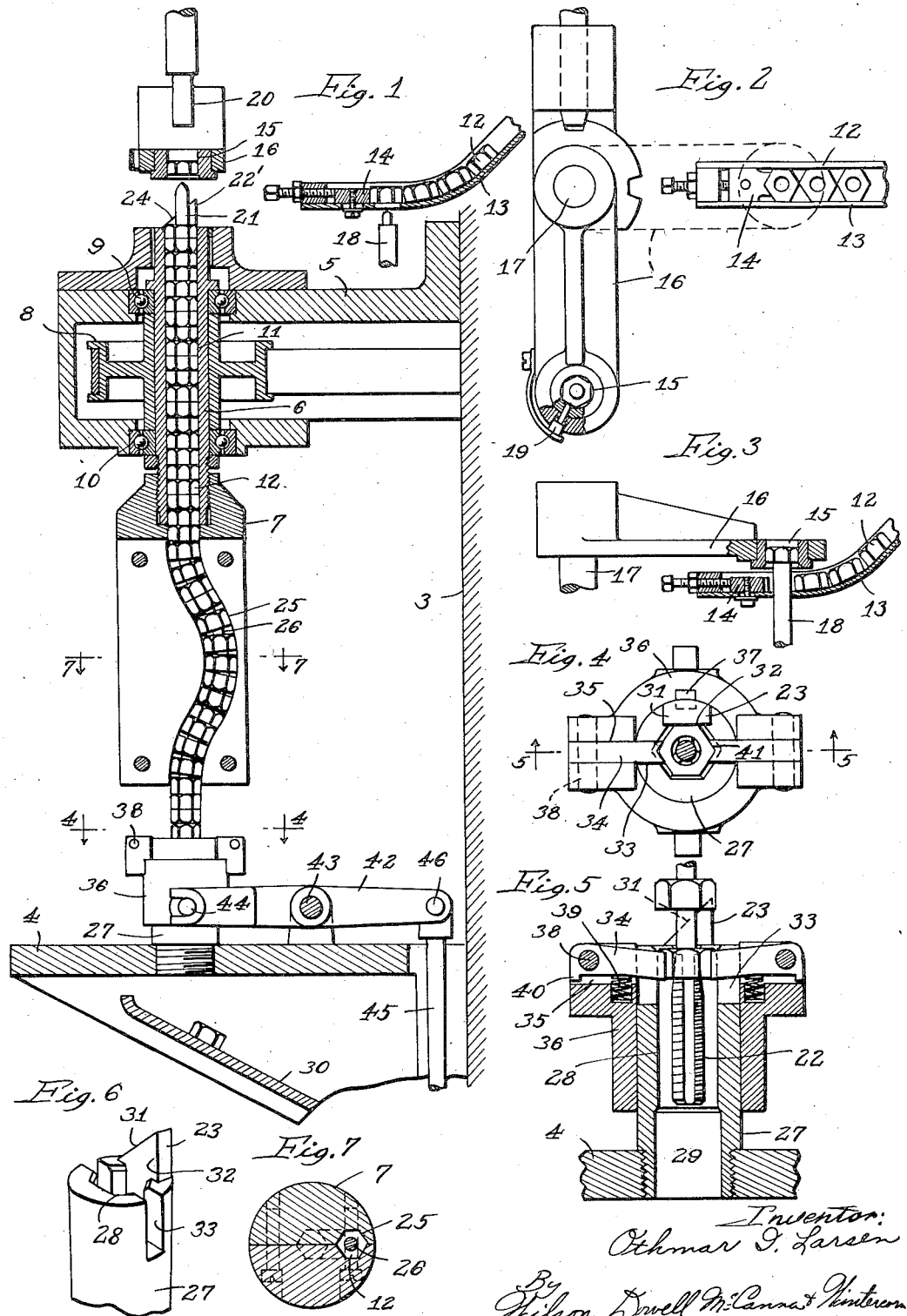

2,037,801

UNITED STATES PATENT OFFICE 2,037,801

NUT TAPPER

Othmar I. Larsen, Winnetka, Ill.

Application October 4, 1934, Serial No. 746,814

18 Claims. (Cl. 10—139)

This invention relates to a new and improved nut tapper.

Nut tappers using a tap with a bent shank for driving the tap are well known. Such machines have invariably provided for the ejection of the nuts from the periphery of a rotating head, which necessitated the provision of a special guard or cover to catch the nuts and direct them to a chute for conveyance from the machine. There are various objections to such machines, the principal one to my mind being that it involves too many complications in design and construction, and such machines are of necessity too large and expensive and out of proportion to the simpleness of the operation to be performed. It is, therefore, the principal object of my invention to provide a nut tapper of simpler and less expensive construction in which the few operating parts required are so arranged that a more compact and practical appearing machine is produced, whose simplicity of construction is more in keeping with the simpleness of the operation to be performed.

The invention is illustrated in the accompanying drawing, in which—

Figure 1 is a vertical section through a machine made in accordance with my invention, showing only the parts with which my invention is concerned;

Fig. 2 is a plan view of the feed mechanism;

Fig. 3 is a front view of the feed mechanism similar to what appears in Fig. 1, but showing the carrier arm in another position corresponding to the dotted line position of Fig. 2;

Fig. 4 is a horizontal section on the line 4—4 of Fig. 1;

Fig. 5 is a vertical section on the line 5—5 of Fig. 4;

Fig. 6 is a perspective view of the nut guide or holder shown in Figs. 4 and 5, and Fig. 7 is a horizontal section through the head of the machine taken on the line 7—7 of Fig. 1.

The same reference numerals are applied to corresponding parts throughout the views.

The machine illustrated comprises a column 3 on which a table 4 is mounted under an arm 5 which supports the operating spindle 6 and head 7. The spindle 6 together with its drive pulley 8 is illustrated as supported on anti-friction bearings 9 and 10. The spindle 6 is tubular and its bore 11 is of a size and shape to slidably receive a stack of nut blanks 12. The blanks are fed from a suitable hopper down a chute 13 against an adjustable stop 14 which serves to insure accurate alignment of the blanks with the hole 15 provided in the outer end of a carrier arm 16 mounted for swinging movement on a vertical shaft 17 to swing through substantially 90° from the dotted line position of Fig. 2 to the full line position, so as to carry a nut blank from the end of the chute 13 to a position over the upper end of the spindle 6. A push rod 18 operating through a hole in the bottom of the chute 13 next to the stop 14 serves to raise the endmost blank from the chute and enter the same frictionally in the hole 15. A small spring-pressed plunger 19 on the arm 16 projects into the hole 15 and serves to grip the blank frictionally. After the arm 16 has picked up a blank, as indicated in Fig. 3, it is moved to the other position shown in Figs. 1 and 2, where another push rod 20 disposed in coaxial relation with the shank 21 of the tap 22 is arranged to eject the blank by downward movement. The ejected blank is caught on the upper end of the shank 21 and moves downwardly by gravity into the upper end of the spindle bore 11. A tooth 22', similar to the tooth 23, hereinafter described (see Fig. 6), has an inclined surface 24 to guide the blank toward registration with the bore 11 which is made hexagonal to fit the hexagonal nut blanks. The inside vertical face of the tooth 22' is in vertical alignment with one of the six flat sides of the bore 11, and, hence, when one of the six corners of a blank rides down the inclined surface 24 and causes the blank to turn to a position where one of its flat sides will ride along the flat face of the tooth, the blank will accordingly be in registration with the bore 11 for feeding downwardly through the bore with the other blanks therein to the tap 22. It is, of course, manifest that, while a hexagonal bore is shown for hexagonal blanks, the same principle would apply for square blanks or blanks of any other polygonal form—a similar tooth with an inclined edge could be provided to bring about proper registration of blanks of any form in the manner described.

The spindle 6 has the head 7 suitably secured thereon so that the upper end of a sinuous passage 25 formed in the head will receive the blanks as they leave the lower end of the spindle, whereby to insure proper feed of the blanks downwardly through the head. The sinuous form of the passage is to accommodate the crank bend 26 provided in the shank 21 slightly above the tap 22. The shank, of course, has every portion thereof centrally disposed with respect to the bore 11 and passage 25 so that there will be no tendency for the blanks to bind in the bore and passage at any point. The fact that the holes in the blanks are, as yet, unthreaded while they are guided over the straight portion and bent portion of the shank, further insures easy movement, there being minimum friction between the blanks and the shank. Furthermore, inasmuch as the blanks transmit drive to the shank at the crank bend 26, it is obviously of advantage to have the same in unthreaded condition at that time so that there will be no likelihood of damaging the threads. While I contemplate having the nut blanks feed downwardly through the bore 11 and passage 25 by gravity, it will, of course, be understood that I may provide means for positively feeding the blanks toward the tap operated in timed relation to the tapping operation. The lower end of the shank 21 just below the crank bend 26 is concentric with the upper end portion and, of course, with the tap 22. The blanks, therefore, enter and leave the spindle in centered coaxial relation thereto.

The tap 22 extends into a tubular guide or holder 27 fixed on the table 4 and arranged to hold the nuts against turning during the tapping operation. The bore 28 corresponds in size and shape to the bore 11, and is, of course, coaxial therewith. Once the blanks are started on the tap 22, they will move downwardly by themselves, sliding through the bore, and pass off the end of the tap into the enlarged circular portion 29 of the bore from which they will either drop directly into a receptacle or onto a chute 30 leading to a receptacle. Each nut, shortly after it has left the head 7, encounters the tooth 23 projecting upwardly from the holder 27. This tooth has an inclined side 31 similarly as the tooth 22', previously described, so that if the nut when it encounters the tooth is not in exact registration with the bore 28, it will be turned into registration by reason of one of its corners riding down on the inclined surface 31 until one of the flat sides of the nut comes flush with the flat surface 32. The latter is in vertical alignment with one of the six flat sides of the bore 28, and as a result serves to guide the blank straight into the bore. The vertical slots 33, provided in diametrically opposite sides of the holder, receive gripping fingers 34 mounted in diametrical slots 35 in a collet 36 slidable up and down on the holder 27. A key 37 splines the collet on the holder so that the collet cannot turn. Pins 38 provide pivotal support for the gripping fingers 34 in the slots 35. Springs 39 normally urge the fingers to move outwardly on these pivots, but such movement is limited by stop projections 40 arranged to seat in the bottom of the slots 35. The inner ends of the fingers have V-shaped grooves 41 provided therein for engagement with the blank from diametrically opposite sides. The collet 36 is arranged to be reciprocated in timed relation to the push rods 18 and 20 by means of a rocker arm 42 pivoted intermediate its ends, as at 43, and at one end to the collet 36, as at 44, and at the other end to a reciprocable rod 45, as at 46.

In operation, there is a solid column of nut blanks extending through the bore 11 and passage 25 down to the holder 27, and, when the rod 45 is pulled downwardly, the collet 36 is raised and the fingers 34 grip the lowermost blank frictionally under pressure of springs 39, so that upon the return movement of the rod 45 when the collet 36 moves downwardly, the blank gripped between the fingers 34 is started on the end of the tap 22 and at the same time entered into the upper end of the bore 28. Since the fingers only grip the blank frictionally and under spring pressure, it is obvious that slight slippage may occur and hence there is no likelihood of damage being done to the tap by reason of ramming of a blank thereon too quickly and positively. Once the blanks are started on the tap and in the bore, they feed automatically through the holder in the progress of the tapping operation, and when they leave the end of the tap they drop by gravity onto the chute 30 for delivery into a suitable receptacle. Each blank, before it is gripped, is automatically registered with the bore 28 by the action of the inclined cam surface 31 on the tooth 23, as previously described.

As indicated in Fig. 7, the lower portion of the head 7 is split lengthwise diametrically so that half of the passage 25 is formed in one part of the head and the other half in the other part, the two parts being suitably secured together after the crank portions 26 of the tap shank has been entered therein.

It should be clear from the foregoing description that the machine of my invention eliminates the objectionable features present in other nut tappers using bent taps, to which reference was made previously. The present machine is of simpler and less expensive construction and has its few operating parts so arranged that greater compactness and better appearance results. The cost of the present machine is, in other words, made in keeping with the simpleness of the operation to be performed thereby.

Some of the novel features contained in the application were disclosed in an earlier application Serial No. 661,835, filed March 30, 1933, which was abandoned in favor of this application.

It is believed the foregoing description conveys a good understanding of the objects and advantages of my invention. The appended claims are drawn with a view to covering all legitimate modifications and adaptations.

I claim:

1. In a nut tapping machine, the combination of a hollow rotary spindle, a tap having a crank formed shank extending from the small end of the tap and carried in said spindle, said shank having an axially disposed receiving end coaxial with the other end on which the tap is provided, the spindle and the crank portion of said tap being constructed to guide smooth bored blanks to the tap for tapping, means for rotating the spindle and thereby the tap through the medium of the smooth bored blanks, and a stationary nut blank holder coaxial with and surrounding the tap.

2. In a nut tapping machine, the combination of a hollow substantially vertical rotary spindle, a tap having a crank formed shank extending upwardly from the small end of the tap and carried in said spindle, said shank having an axially disposed receiving end coaxial with the other end on which the tap is provided, the spindle and the crank portion of said tap being constructed to guide smooth bored blanks to the tap for tapping, means for rotating the spindle and thereby the tap through the medium of the smooth bored blanks, means above the spindle and tap for feeding said blanks thereto, a stationary nut blank holder coaxial with and surrounding the tap, and means below the nut holder and tap arranged to receive tapped blanks dropped by gravity thereto from the tap.

3. In a nut tapping machine, the combination of a hollow rotary spindle, a tap having a crank formed shank extending from the small end of the tap and carried in said spindle, said shank having an axially disposed receiving end coaxial with the other end on which the tap is provided, the spindle and the crank portion of said tap being constructed to guide smooth bored blanks to the tap for tapping, means for rotating the spindle and thereby the tap through the medium of the smooth bored blanks, a stationary holder and guide for said blanks surrounding the tap to prevent turning of the blank during the tapping thereof, said holder having a polygonal shaped bore corresponding in size and shape to the blanks adapted to be passed therethrough, and stationary means for automatically stopping and registering the rotating blanks with the bore after they leave the spindle and before they enter said holder for the tapping operation.

4. A machine as set forth in claim 3 wherein the last mentioned means comprises a tooth projecting from the holder alongside the bore having an inclined edge for engagement with a corner of an unregistered blank to cause the blank to turn into registering position.

5. A machine as set forth in claim 3 wherein the last mentioned means comprises a tooth projecting from the holder alongside the bore having an inclined edge for engagement with a corner of an unregistered blank to cause the blank to turn into registering position, and said tooth having a flat surface in the same plane with one flat side of the bore for engagement with a flat side of the blank to aid in guiding the blank into the bore.

6. In a machine of the class described, a stationary nut holder, a hollow rotary spindle in coaxial alignment therewith, a crank-formed tap in said spindle having receiving and threading ends on opposite sides of a crank portion with the receiving and threading ends in coaxial relation therewith and with the threading end disposed in the nut holder, means for intermittently feeding smooth bored blanks onto the receiving end of the shank and into said spindle to slide along the shank of the tap to the threading end, whereby to support the tap in the spindle and transmit rotation thereto from the spindle, and a member reciprocable relative to the nut holder having means thereon for frictionally gripping a blank whereby on the working stroke of the member to enter the blank in the holder and simultaneously start the blank on the threading end of said tap, the holder being arranged so that threaded blanks may be discharged therefrom by gravity.

7. In a machine of the class described, a stationary nut holder, a hollow rotary spindle in coaxial alignment therewith, a crank-formed tap in said spindle having receiving and threading ends on opposite sides of a crank portion with the receiving and threading ends in coaxial relation therewith and with the threading end disposed in the nut holder, means for intermittently feeding smooth bored blanks onto the receiving end of the shank and into said spindle to slide along the shank of the tap to the threading end, whereby to support the tap in the spindle and transmit rotation thereto from the spindle, the nut holder having a polygonal bore corresponding in size and shape to the blanks adapted to be passed therethrough, stationary means between the spindle and the nut holder for automatically stopping and turning the rotating blanks on the shank of the tap into register with the bore, and a member reciprocable relative to the nut holder having means thereon for frictionally gripping a blank whereby on the working stroke of the member to enter the blank in the holder and simultaneously start the blank impositively on the threading end of said tap, the holder being arranged so that threaded blanks may be discharged therefrom by gravity.

8. In a machine of the class described, a stationary nut holder, a hollow rotary spindle in coaxial alignment therewith, a crank-formed tap in said spindle having receiving and threading ends on opposite sides of a crank portion with the receiving and threading ends in coaxial relation therewith and with the threading end disposed in the nut holder, means for intermittently feeding smooth bored blanks onto the receiving end of the shank and into said spindle to slide along the shank of the tap to the threading end, whereby to support the tap in the spindle and transmit rotation thereto from the spindle, the spindle having a polygonal bore corresponding in size and shape to the blanks adapted to be passed therethrough, the tap having its shank centrally disposed in said bore with the blank receiving end extending from the inlet end of the bore, means between the blank feeding means and the inlet end of said bore for automatically turning the blanks on the shank into register with said bore, and a member reciprocable relative to the nut holder having means thereon for frictionally gripping a blank whereby on the working stroke of the member to enter the blank in the holder and simultaneously start the blank impositively on the threading end of said tap, the holder being arranged so that the threaded blanks may be discharged therefrom by gravity.

9. A machine as set forth in claim 7 wherein the blank registering means comprises a tooth projecting from the holder alongside the bore having an inclined edge for engagement with a corner of a blank to cause the blank to turn into registering position, said tooth having a flat surface in the same plane with one flat side of the bore for engagement with a flat side of the blank to aid in guiding the blank into the bore.

10. A machine as set forth in claim 8 wherein the blank registering means comprises a tooth projecting from the spindle alongside the bore having an inclined edge for engagement with a corner of a blank to cause the blank to turn into registering position, said tooth having a flat surface in the same plane with one flat side of the bore for engagement with a flat side of the blank to aid in guiding the blank into the bore.

11. In a nut tapping machine, a stationary nut holder through which nut blanks are arranged to pass downwardly in the tapping operation, means therebeneath to receive tapped nuts discharged thereto by gravity, a vertical rotary spindle above the nut holder and substantially coaxial therewith, a crank-formed tap having its smooth bent shank carried in the spindle so that the threading end projects downwardly from the spindle into the nut holder, means for entering smooth bored blanks into the upper end of the spindle to slide downwardly through the bore and along the shank of the tap toward the threading end with the aid of gravity, said blanks serving to support the tap and transmit rotation thereto, and a member reciprocable relative to the nut holder having means thereon for frictionally gripping a blank whereby on the down stroke of the member to enter the blank in the holder and simultaneously start the blank impositively on the threading end of said tap.

12. In a nut tapping machine, a stationary nut holder through which nut blanks are arranged to pass downwardly in the tapping operation, means therebeneath to receive tapped nuts discharged thereto by gravity, a vertical rotary spindle above the nut holder and substantially coaxial therewith, a crank-formed tap having its smooth bent shank carried in the spindle so that the threading end projects downwardly from the spindle into the nut holder, means for entering smooth bored blanks into the upper end of the spindle to slide downwardly through the bore and along the shank of the tap toward the threading end with the aid of gravity, said blanks serving to support the tap and transmit rotation thereto, the nut holder having a polygonal bore corresponding in size and shape to the blanks adapted to be passed therethrough, stationary means between the spindle and the nut holder for automatically stopping and turning the rotating blanks on the shank of the tap into register with the bore, and a member reciprocable relative to the nut holder having means thereon for frictionally gripping a blank whereby on the down stroke of the member to enter the blank in the holder and simultaneously start the blank impositively on the threading end of said tap.

13. In a nut tapping machine, a stationary nut holder through which nut blanks are arranged to pass downwardly in the tapping operation, means therebeneath to receive tapped nuts discharged thereto by gravity, a vertical rotary spindle above the nut holder and substantially coaxial therewith, a crank-formed tap having its smooth bent shank carried in the spindle so that the threading end projects downwardly from the spindle into the nut holder, means for entering smooth bored blanks in to the upper end of the spindle to slide downwardly through the bore and along the shank of the tap toward the threading end with the aid of gravity, said blanks serving to support the tap and transmit rotation thereto, the spindle having a polygonal bore corresponding in size and shape to the blanks adapted to be passed therethrough, the tap having its shank centrally disposed in said bore with the blank receiving end extending from the inlet end of the bore, means between the blank feeding means and the inlet end of said bore for automatically turning the blanks on the shank into register with said bore, and a member reciprocable relative to the nut holder having means thereon for frictionally gripping a blank whereby on the down stroke of the member to enter the blank in the holder and simultaneous start the blank on the threading end of said tap.

14. A machine as set forth in claim 12 wherein the blank registering means comprises a tooth projecting from the holder alongside the bore having an inclined edge for engagement with a corner of a blank to cause the blank to turn into registering position, said tooth having a flat surface in the same plane with one flat side of the bore for engagement with a flat side of the blank to aid in guiding the blank into the bore.

15. A machine as set forth in claim 13 wherein the blank registering means comprises a tooth projecting from the spindle alongside the bore having an inclined edge for engagement with a corner of a blank to cause the blank to turn into registering position, said tooth having a flat surface in the same plane with one flat side of the bore for engagement with a flat side of the blank to aid in guiding the blank into the bore.

16. A nut tapper comprising a stationary nut guide, a tap rotatable centrally therein with the small end toward the intake end of the guide, a shank for driving the tap extending from the small end thereof having a nut receiving end in coaxial alignment with the tap, whereby to permit feeding nuts onto said end while the shank is rotating, said shank having a crank bend therein intermediate the ends thereof for drive purposes, a hollow drive spindle having a sinuous longitudinal bore provided therein receiving all but a short portion of the shank next to the tap and a short portion of the receiving end of the shank, means for feeding nuts to be tapped onto and along the receiving end of the shank whereby the nuts are used for driving the shank prior to threading of the nuts by the tap, means for driving the spindle whereby to drive the shank and tap, and a cam stationary with the nut guide arranged to engage the blanks as they emerge from the spindle and to stop and turn the same into register with the guide.

17. A nut tapper as set forth in claim 16 including means reciprocable relative to the nut guide to frictionally grip a nut after registration thereof with the guide and impositively start the nut on the small end of the tap and simultaneously enter the same in the guide.

18. A nut tapper as set forth in claim 16 wherein the nut guide, tap, shank, and drive spinde are all disposed on a common vertical axis with the receiving end of the shank uppermost, whereby the feeding of the nuts along the shank through the spindle is aided by gravity.

OTHMAR I. LARSEN.